(12) United States Patent
Lundh

(10) Patent No.: US 6,371,498 B2
(45) Date of Patent: Apr. 16, 2002

(54) WHEEL SUSPENSION

(76) Inventor: Joran Lundh, Vistakulle, S-561 92 Huskvarna (SE)

( * ) Notice: Subject to any disclaimer, the term of this patent is extended or adjusted under 35 U.S.C. 154(b) by 0 days.

(21) Appl. No.: 09/771,566

(22) Filed: Jan. 30, 2001

Related U.S. Application Data

(63) Continuation of application No. PCT/SE98/01494, filed on Aug. 20, 1998, now abandoned.

(51) Int. Cl.⁷ ................................................. B62B 9/00
(52) U.S. Cl. ............ 280/47.38; 280/32.7; 280/124.164; 280/124.179; 16/44; 267/70; 403/365; 403/372; 248/616; 248/622
(58) Field of Search ........................ 16/44, 35 D, 35 R; 280/124.1, 47.58, 124.164, 124.179, 658, 32.7, 276, 47.38, 642, 43, 43.18, 43.22, 11.28, 87.03, 87.041, 87.043, 79.11; 267/169, 170, 174, 175, 177, 287, 70, 72; 403/365, 366, 372; 248/608, 616, 622, 188.8, 188.5

(56) References Cited

U.S. PATENT DOCUMENTS

| | | |
|---|---|---|
| 726,447 A | 4/1903 | McDonnell |
| 1,834,617 A | 12/1931 | Harpine et al. |
| 1,906,238 A * | 5/1933 | Ramsey et al. ................. 16/44 |
| 1,944,185 A | 1/1934 | Langer |
| 2,325,895 A * | 8/1943 | Rupp, II ...................... 280/276 |
| 3,911,525 A * | 10/1975 | Haussels ...................... 16/35 R |
| 4,077,086 A * | 3/1978 | Butler ............................. 16/44 |
| 5,622,375 A * | 4/1997 | Fairclough .................. 280/642 |
| 5,975,545 A * | 11/1999 | Hu ........................... 280/47.38 |

FOREIGN PATENT DOCUMENTS

DE 24 22 154 A1 * 11/1975

* cited by examiner

*Primary Examiner*—Lanna Mai
*Assistant Examiner*—Ruth Ilan
(74) *Attorney, Agent, or Firm*—Pillsbury Winthrop LLP

(57) ABSTRACT

The present invention is for a device for mounting of wheels so that they may move in a preferably vertical direction at right angle to the wheel shaft. The invention is also standing board for prams having such wheel mounting. At its from end the standing board has a mounting means by which the standing board is pivotably mounted to the rear axle of a pram the main direction of movement of which is shown by arrow. The turning shaft of the wheel is mounted in a movable sleeve the movements of which are controlled both by a brushing which surrounds the sleeve and by a tube which is partially inserted into a groove in the sleeve. A spring is placed into the groove in the sleeve so that the spring contacts both the bottom of the groove and the end of the tube which penetrates the groove.

2 Claims, 2 Drawing Sheets

WHEEL SUSPENSION

This application is a continuation of PCT/SE98/01494, filed Aug. 20, 1998, now abandoned.

The present invention is for a device for mounting of wheels so that they are movable in a preferably vertical direction at right angle to the axis of rotation of the wheel. The invention also is for a standing board for prams with such a wheel mounting.

BACKGROUND OF THE INVENTION

Standing boards for prams are intended to be attached to the pram in order to make it possible for a brother or sister or another a little older child to come along standing an the board. Usually it is adapted to be attached to the rear wheel axle of the pram and the child is standing between the body and the handle of the pram. The board is carried by a mounting at the rear axle and by two wheels adjacent the rear end of the board. The wheels of the board are mounted so that they may be turned around a vertical axis. The mounting at the rear axle also allows the board to turn around it to enable the passing of curbs and other minor hindrances. The wheels of the board are mounted thereto without any other possible movements except for the turning around a vertical shaft mentioned above. The non-resilient function causes blows and bounces of the board which give an uncomfortable feeling and may cause the child who is riding an the board to make sudden motions or fall of the board. Blows and bounces, even of small strength, cause noise and sounds which may be very disturbing.

SUMMARY OF THE INVENTION

The present invention is for a wheel mounting which allows resilient motion in the direction of the turning axis of the wheel, mainly in vertical direction. The device is primarily intended for standing boards for prams but may also be used for other applications where there is only a limited space available in the direction of the resilient movement One object of the invention is to enable resilience in a direction where the space available is very limited. It is also an object of the invention to achieve a steady mounting and control of the movable parts. It is a further object to reduce the sound and noise which is caused by the standing board.

BRIEF DESCRIPTION OF THE DRAWINGS

The invention will below be described more in detail with reference to the examples of embodiments thereof which are shown in the enclosed drawings.

DETAILED DESCRIPTION OF AN EMBODIMENT OF THE INVENTION

Figure 1:
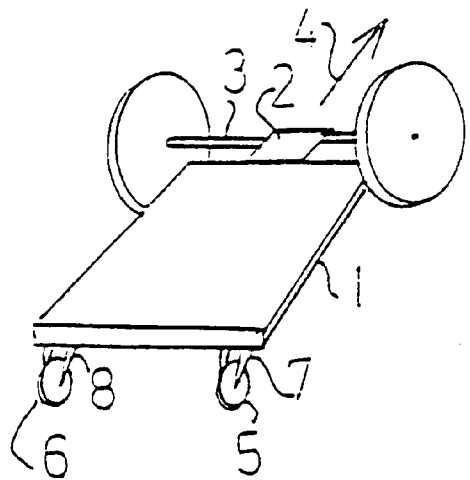
FIG. 1 shows a standing board which is attached to the rear axle of a pram.

The standing 1 board which is shown in FIG. 1 has a mounting means 2 at its front end by means of which the standing board is rotatably attached to the rear axle of a pram the main direction of moving is shown by arrow 4. The mounting allows turning both around the axle 3 of the pram and around an axle which is parallel with the direction of movement by which the mounting means 2 is attached to the board 1. At the rear end of the standing board there are two wheels 5 and 6 which are carried by wheel shafts in wheel forks 7 and 8 which are pivotably mounted into the standing board. According to the invention the mounting to the standing board is made so that the wheels and the wheel forks may spring in a mainly vertical direction at right angle to the standing board.

Figure 2:
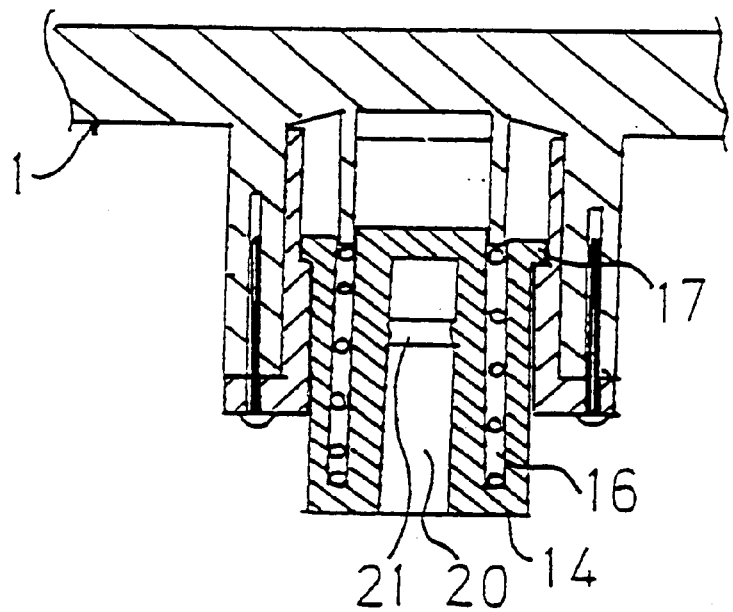
FIG. 2 is a cross section of a device according to the invention.
Figure 3:
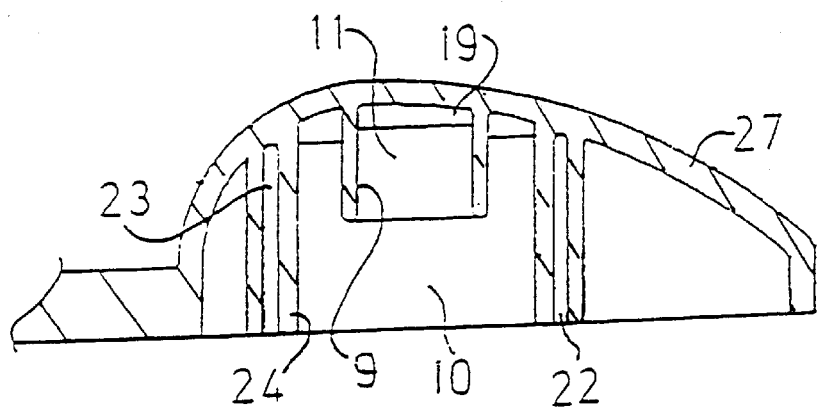
FIG. 3 shows the mounting part of a standing board.
Figure 4:
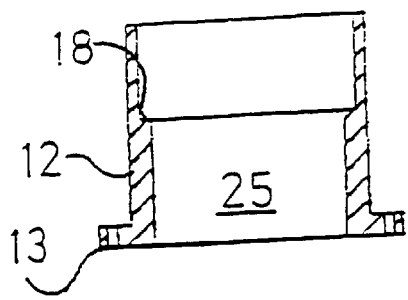
FIGS. 4 and 5 show parts included in the device of the invention.
Figure 5:
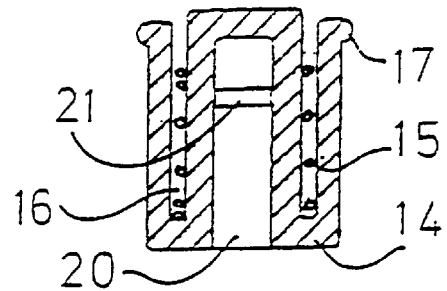
Figure 6:
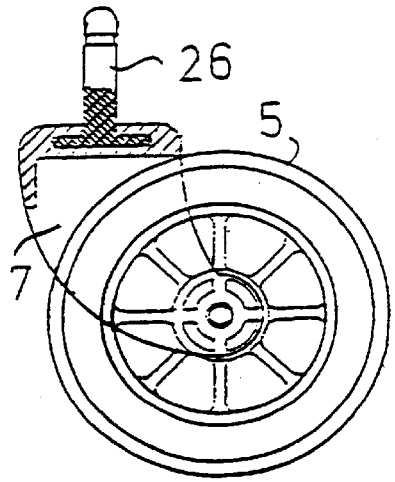
FIG. 6 shows a wheel together with its wheel fork and turning axis.

The device of the invention is shown in cross section without wheel and wheel fork in FIG. 2 and the various parts thereof are shown in cross section in FIGS. 3–5. A wheel of the kin which is mostly used for standing boards is shown in FIG. 6. For reasons of production technology the parts of FIGS. 4 and 5 are preferably made with circular cross sections at right angle to the plane of the figures.

The device includes both parts which are fixed to the standing board and preferably are made in one piece with it and movable parts according to FIGS. 4–6. In FIG. 3 the fixed parts are shown integrated with the board 1 and enclosed by a hood 27 which forms a part of the board 1. The fixed parts comprise an outer tube 24 and an inner tube 9. The tube 24 encloses a first inner space 10 and the tube 9 encloses a second inner space 11. In the inner tube 9 there are also stops or bars which form stops for the movable parts at the maximum springing length. A bushing 12 is mounted into the tube 4 and by means of screws through holes in the flanges 13 mounted into the holes 22 and 23 therefor. In the bushing 12 there is a movable sleeve 14 which moves in the opening 25 of the bushing 12. The movements of the sleeve in the bushing are delimited both by a somewhat protruding edge 17 at the bushing and the corresponding inner edge 18 of the bushing, and by the above mentioned bars 19 in that part of the mounting which is included in the standing board. In the sleeve 14 there is also a groove 16 the dimensions of which correspond to the tube 9 of the mounting part so that this tube may be inserted into the groove. In the groove 16 there is also a spiral spring 15 which contacts both the bottom of the groove 16 and the lower edge of the tube 9. In the sleeve 14 there is also a central hole 20 which is open downwards and into which the shaft 25 which is fixed to the wheel fork 7 is inserted and fixed in known manner by snap fastening at the inwardly turned ring 21.

The resilient springing means is shown without load in FIG. 2 and it is apparent that the movements of the sleeve 14 is limited by co-operation with the bushing 12 at the edges 17 and 18. The tube 9 is inserted a little into the groove 16 and the spring 15 contacts the lower edge of the tube. At a springing movement the sleeve 14 is loaded in a direction upwards in the figure by influence from the shaft 26 which is inserted into the hole 20 and the sleeve moves upwards, maximally to contact with the bar 19. The sleeve is then controlled both by the cuter surrounding bushing 12 and the tube 9. Thereby that the sleeve is so controlled at both its ends one achieves a straight springing movement without that the sleeve breaks away to the side which means both safe function and reduced wear.

What is claimed is:

1. A combination with a turnable wheel fork and a turning shaft upwardly extending from said fork, of a mounting device comprising:

a movable sleeve having a downwardly extending central opening receiving said turning shaft, said movable sleeve having an upwardly extending groove which surrounds said central opening, a tube partially inserted into said groove, a bushing surrounding said sleeve which bushing, together with said tube, controls movements of said movable sleeve, and a spring disposed in said groove between said tube and a bottom of said groove.

2. The combination as in claim 1 including a standing board for prams, said bushing being secured to said standing board.

* * * * *